S. & S. L. HALL.
Lubricating Car-Wheels.

No. 158,067.  Patented Dec. 22, 1874.

WITNESSES.
P. C. Dieterich
H. C. Scott

INVENTORS.
Simon Hall
and
Samuel L. Hall per G. J. Ferriss & Co
ATTORNEYS.

UNITED STATES PATENT OFFICE.

SIMON HALL AND SAMUEL L. HALL, OF AHNAPEE, WISCONSIN.

IMPROVEMENT IN LUBRICATING CAR-WHEELS.

Specification forming part of Letters Patent No. 158,067, dated December 22, 1874; application filed April 17, 1874.

*To all whom it may concern:*

Be it known that we, SIMON HALL and SAMUEL L. HALL, of the town of Ahnapee, in the county of Kewaunee and State of Wisconsin, have invented certain new and useful Improvements in Car-Wheels; and we do hereby declare the following to be a full, clear, and exact description of the invention, such as will enable others skilled in the art to which it pertains to make and use it, reference being had to the accompanying drawings, which form part of this specification.

The nature of our invention consists in having one loose wheel and one tight wheel on the same axle; also, in the device for lubricating the loose wheel, and in the mode of packing, preventing the escape of the oil, and the ingress of dust between the wheel and the journal.

Figure 1:
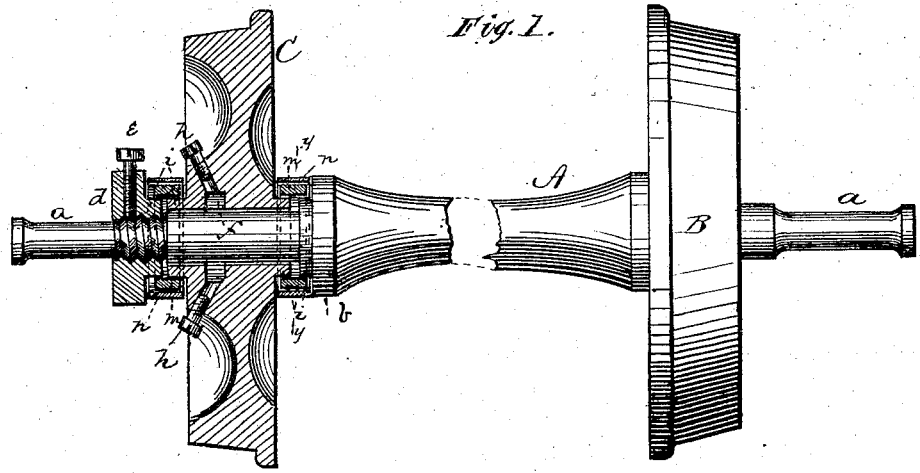
Figure 2:
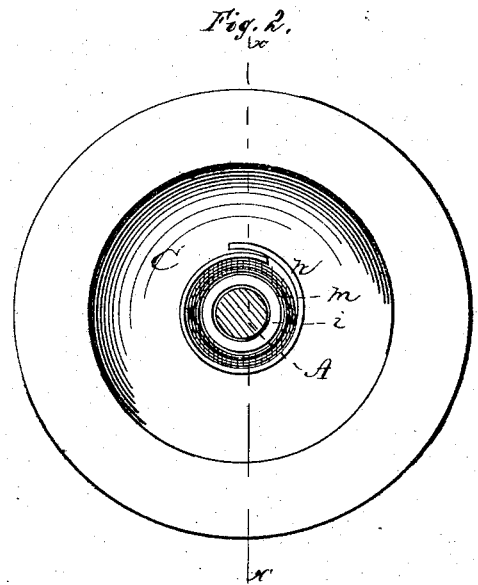

In the accompanying drawing, Figure 1 is a side view of the car-axle, with the stationary wheel and the loose wheel in section. Fig. 2 is a transverse section through the line $yy$, Fig. 1.

A represents an ordinary car-axle, having the usual journal $a$ turned upon each end, and provided, near one end, with the wheel B, made fast thereon in any of the known and usual ways. Near the other end of the axle is placed a wheel, C, turning loosely thereon, and confined between a stationary collar, $b$, and a movable collar, $d$, the latter being screwed upon the inner end of the journal $a$, at that end of the axle, and fastened by a set-screw, $e$. The center of the hub of the loose wheel C is chambered out, forming an oil-cup or oil-receptacle, $f$, and has two opposite openings through the hub for filling with oil, said openings being closed by means of screw-plugs $h\ h$. The ends of the hub of the loose wheel C, as well as the adjoining ends of the collars $b\ d$, are turned down, as shown at $i$, to receive surrounding packing $m$, which is held firmly in place by means of circular springs $n$, which operate to retain the oil on the bearings, and also to exclude the dust.

Having thus fully described our invention, what we claim as new, and desire to secure by Letters Patent, is—

The packing $m$ and circular spring $n$, in combination with the turned-down hub of the loose wheel C, and turned-down adjoining collars $b\ d$, substantially as and for the purposes set forth.

In testimony that we claim the foregoing we have hereunto set our hands.

SIMON HALL.
      SAMUEL L. HALL.

Witnesses:
 JNO. L. V. YATES,
 PETER SCHIESSER.